United States Patent [19]

Vassiliou

[11] 4,183,998

[45] Jan. 15, 1980

[54] CRAZE-RESISTANT POLYSILOXANE RESIN COATINGS AND COATING COMPOSITIONS CONTAINING A DISCONTINUOUS PHASE

[75] Inventor: Eustathios Vassiliou, Newark, Del.

[73] Assignee: E. I. Du Pont de Nemours and Company, Wilmington, Del.

[21] Appl. No.: 892,300

[22] Filed: Mar. 31, 1978

Related U.S. Application Data

[62] Division of Ser. No. 829,824, Sep. 1, 1977.

[51] Int. Cl.² .................. B32B 5/16; B32B 27/00; B05D 3/02
[52] U.S. Cl. ................... 428/327; 260/824 R; 427/387; 427/388 A; 427/388 D; 428/336; 428/419; 428/447; 428/450; 428/474

[58] Field of Search ............ 260/823, 824 R; 427/387, 388 D, 388 A; 428/447, 450, 474, 327, 336, 419

[56] References Cited

U.S. PATENT DOCUMENTS

| | | | |
|---|---|---|---|
| 3,288,754 | 11/1966 | Green | 260/824 R |
| 3,592,790 | 7/1971 | Flanner et al. | 260/824 X |
| 3,723,385 | 3/1973 | Hoback et al. | 260/824 X |
| 3,926,911 | 12/1975 | Greber et al. | 260/824 X |
| 4,125,510 | 11/1978 | Antonen | 260/37 SB |

*Primary Examiner*—Michael R. Lusignan

[57] ABSTRACT

Polysiloxane resin coatings containing a dispersed phase of particulate organic modifier which is tougher than the polysiloxane and which has an adequately high coefficient of friction have improved craze resistance permitting the use of thicker coatings with greater durability.

16 Claims, No Drawings

CRAZE-RESISTANT POLYSILOXANE RESIN COATINGS AND COATING COMPOSITIONS CONTAINING A DISCONTINUOUS PHASE

This is a division, of application Ser. No. 829,824, filed Sept. 1, 1977.

BACKGROUND OF THE INVENTION

The present invention relates to coating compositions containing polysiloxane resin-forming precondensates and to articles coated with such compositions.

Various polysiloxanes have been used as major or minor constituents of coating compositions, normally blended with other materials which affect the properties of the coatings. See U.S. Pat. No. 3,655,565—McDonald (1972) and U.S. Pat. No. 3,062,764—Osdal (1962) for disclosures of the technology of polysiloxane-containing composites. Osdal uses small amounts of polysiloxane resins to prevent mud cracks in fluorocarbon coatings. However, it has been found that polysiloxane-based resin coatings have a tendency to stress craze or form cracks when they are applied in relatively thick coatings for increased durability, such as with thicknesses above 20 microns ($\mu$m).

Polysiloxane homopolymer resins and more costly copolymer resins such as those reacted with epoxies are sometimes used as nondurable food release coatings in combination with substantial proportions of silicone oils. The oils are fluids which facilitate application of the coatings and improve release of burned-on food residues. Such coatings are often formulated for relatively low temperature cure. Applications for such coatings include bakery pans which can be recoated frequently or even before each use. See U.S. Pat. No. 3,419,514—Hadlock (1968), U.S. Pat. No. 3,308,080—Haenni (1967) and U.S. Pat. No. 3,801,522—Vasta (1974). The polysiloxane fluid improves release performance of such coatings, but coatings relying on the fluids have limited durability and may not be used many times without recoating. Typical applications of durable coatings are household cookware for top-of-the-range cooking or oven baking which are provided with a nonstick coating that lasts for the life of the item of cookware.

Special siloxanes, homopolymers and copolymers and mixtures of organopolysiloxanes with such organic materials as polyethers are sometimes used for nonstick coatings for bread pans or for consolidated materials resistant to thermal and environmental stresses such as molding compounds. See U.S. Pat. Nos. 2,672,104 and 2,672,105—both Clark (1954). U.S. Pat. No. 3,423,479—Hendricks (1969) discloses polyether coating compositions containing up to 30% polysiloxanes, and U.S. Pat. No. 3,536,657—Noshay et al. (1970) discloses coating compositions containing polyethers and polyether-polysiloxane copolymers. In both patents, the polyethers include particulate polysulfones, and the coatings are generally thermoplastic.

Carbon black and powdered graphite have been added to thin polysiloxane coatings to improve the heat transfer characteristics, U.S. Pat. No. 3,078,006—Price et al. (1963).

Some attempts to make a durable coating for cookware are described in Defensive Publication No. T937,005—Vasta published Aug. 5, 1975 by the U.S. Patent and Trademark Office. A solution of polysulfone resin is mixed with up to 25% by weight of the total of a silicone oil or a silicone resin to produce coatings typically 50 $\mu$m thick, about 2 mils, but up to 250 $\mu$m (10 mils).

It would be desirable to have a more durable polysiloxane-resin based coating which could be applied in thick layers without being subject to craze cracking and without the necessity of using multiple thin layers.

SUMMARY OF THE INVENTION

The present invention provides a coating composition consisting essentially of a cross-linkable polysiloxane resin-forming precondensate and 5–30%, preferably 10–20%, by weight of a particulate organic material, referred to herein as a modifier since it modifies the characteristics of the coating to give improved craze resistance, wherein the modifier has an average particle size in the range of 0.1–15 $\mu$m, preferably 0.5–5 $\mu$m, and wherein the modifier is tougher than the crosslinked coating made from the coating composition, and the modifier has a higher static coefficient of friction against the polysiloxane resin than does polytetrafluoroethylene. Percentages herein are based on the combined weight of the polysiloxane resin or resin-forming precondensate and the modifier, except where stated otherwise.

Preferably, the polysiloxane resin-forming precondensate is a polysiloxane resin-forming precondensate having one or more of the units

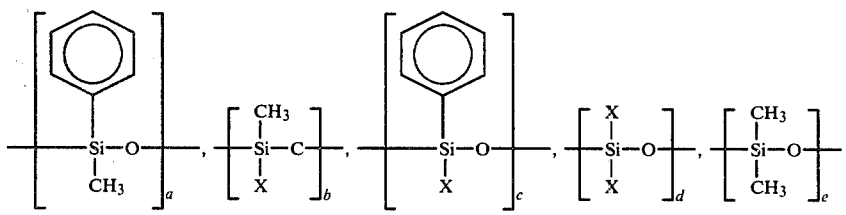

wherein

X is a functional group which allows cross-linking at its site, and a, b, c, d and e are of a magnitude and in proportions which provide the resin with a degree of substitution, measured as the ratio of phenyl plus methyl groups to silicon atoms, of at least about 1.0, and a ratio of phenyl groups to silicon atoms of at least about 0.3.

Preferably, X is the hydroxyl group and the silicon-bonded hydroxyl content is at least about 3%, more preferably at least about 4%, based on the weight of the precondensate. Precondensates having a random arrangement of the repeating units in any order are, of course, included.

The modifier is preferably a polyarylene sulfide (more preferably polyphenylene sulfide), a polyarylene sulfone, a polyamide-imide resin, or a polyparahydroxy benzoic acid. It is desirable that the modifier be compatible but not reactive with the polysiloxane. Polysiloxane rubbers that meet the claim criteria are included among the modifiers. Particle sizes herein are approximate averages measured optically by microscope in the coating composition or in a coating that has been applied to a substrate.

The coating compositions consist essentially of the precondensate and the modifier in the sense that adjuvants can be added such as oils, pigments, colorants, hardeners, extenders, fluorocarbons, surface active agents, solvents for the polysiloxanes, liquid carriers, coalescing agents, catalysts, etc., which do not materially affect the basic and novel characteristics of the invention of permitting thick craze-resistant, durable polysiloxane coatings. Similarly, while single homopolymers of the defined polysiloxanes are preferred, mixtures and copolymers of various polysiloxanes can be used. However, heterogeneous copolymers with other organic moieties such as epoxies have much less need for the advantages of the present invention and are not within its scope.

The invention also includes substrates coated with such coating compositions which have been cured wherein the cross-linked polysiloxane is present as a continuous phase having dispersed throughout it a discontinuous particulate phase of the organic modifier. The coating is preferably about 20–125 μm (0.8–5 mils), more preferably about 25–75 μm (1–3 mils) thick. Although the advantages of the invention are realized best with coatings of 20–125 μm thickness, similar advantages are obtained with coatings outside this range. At lower thicknesses, stresses are relieved and the coating is tougher than without the modifier. At higher thicknesses, stress relief and craze avoidance or minimization are still advantages.

Preferably the average particle size of the modifier is less than one-half of the thickness of the coating. It is desirable and more preferable that it be less than one-quarter the thickness of the coating.

Furthermore, the invention includes processes for producing such coated substrates by applying and curing a coating of such a composition.

DETAILED DESCRIPTION OF THE INVENTION

A relatively tough dispersed phase of modifier which adequately resists slippage against the polysiloxane diminishes the tendency of thick polysiloxane coatings to stress craze or form cracks. The modifier particles are dispersed more or less uniformly throughout the continuous phase of polysiloxane resin. Although applicant does not wish to be bound by any particular theory, the invention may achieve its advantages because the dispersed particles block cracks and absorb stresses set up in the polysiloxane composition as it cures to form a coating in the form of a thick film.

It is thought that the invention is broadly applicable to the use of polysiloxane resins. Such resins are provided in coating compositions in the form of resin-forming precondensates of varying molecular weight containing functionality, generally silanol functionality, which causes cross-linking upon curing to form a rigid three-dimensional macropolymer matrix. It is within this matrix that the relatively tough and adherent particulate material used in the present invention is dispersed. The precondensates will generally be of relatively low molecular weight, such as 1000 or 1100, and enough of the precondensate molecules will have three or more functional groups to cause the formation of a resin with a rigid, cross-linked, three-dimensional matrix upon condensation or curing. Preferably, the matrix will be hard and have a low degree of elongation, such as 2–4%, in contrast with elastomers which are soft and have a high degree of elongation, such as 30% or more. Cross-linking of the polysiloxanes can be accomplished by techniques known in the art, such as catalysis and heat. Cross-linking can take place at hydroxyl groups, halogens, hydrocarbyloxy groups, and acyloxy groups.

Polysiloxane resins and resin-forming precondensates of the invention can be prepared by techniques known in the art. Generally, desired proportions of dimethyldichlorosilane, methylphenyldichlorosilane, and sometimes dimethyldichlorosilane are hydrolized to form cyclic structures, and then the cyclic structures are polymerized with acid or base to form the polysiloxane resin-forming precondensate. It is evident that appropriate proportions of the units selected for the structural formula must be provided in order to achieve the ratios of the preferred compositions and in order to obtain the desired resin-forming precondensates. For instance, those skilled in the art would know that if a, b, c and e are each zero and the structure is made entirely of

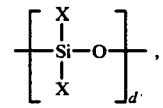

the resulting composition would be hydrated silicon dioxide which is not a resin-forming precondensate. Also, if b, c and d were all zero and the resin were made entirely of

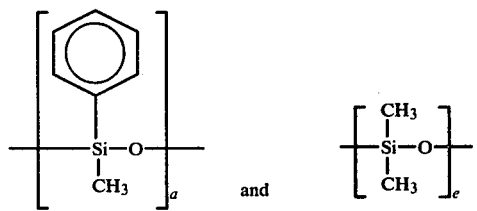

the result would be a elastomer rather than a resin.

Although thinner or less durable films or coatings of polysiloxane resins were previously available, the present invention permits the use of such polysiloxanes to produce much thicker coatings. Polysiloxane oils or fluids that do not significantly cross-link are not a necessary part of applicant's coatings, but they can be included. Also, thermal degradation of polysiloxane oils can produce cross-linked resin-like products that are more durable than the oils in coatings.

In elevated temperature uses, such as the cookware applications for which the invention is particularly suitable, it is desirable that the coatings be thermosetting rather than thermoplastic, and constituents of the coating compositions generally are readily thermosetting and can be selected to achieve thermosetting coatings.

Stress crazing is the formation of minute cracks, generally during or soon after the curing of a coating and due to stresses set up in the coating by shrinkage during curing. If the strength and ductility of the coating are insufficient to absorb the stresses and strains of curing shrinkage, craze cracks can form throughout the coating. Such cracks are, of course, deleterious to the coatings and impair their durability and nonstick performance. Often, stress crazing takes the familiar form of triaxial cracks in the coating, commonly known as crow's feet because of their resemblance thereto. Such cracks also sometimes resemble and are referred to as mud cracks. In addition to forming upon curing, such cracks can also form upon extended use due to thermal, mechanical and environmental stresses.

In addition to adequate friction which tends to prevent slippage between the modifier particles and the resin of the continuous phase, it is important that the modifier be tougher than the polysiloxane resin. The combination of friction and greater toughness is important in minimizing stresses and the incipient formation of cracks in the relatively brittle polysiloxane resin. Stress crazing and crack formation is minimized both by dispersing stresses and by terminating microcracks if and where they do form before they can propagate to a substantially deleterious extent.

The static coefficient of friction against the polysiloxane should be higher than that of polytetrafluoroethylene against the polysiloxane to inhibit slippage between the modifier particles and the polysiloxane matrix. This results in greater effectiveness of the modifier in increasing craze resistance. It has been found that the craze resistance of polysiloxane coatings filled with particulate polytetrafluoroethylene is not adequate. Thus, the static coefficient of friction of the modifier is specified to be higher than that of polytetrafluoroethylene against the polysiloxane. Any affect of adherence of the modifier to the polysiloxane would be taken into account in determining the relative static coefficient of friction, and greater degrees of adherence than polytetrafluoroethylene exhibits to polysiloxane are desirable.

The static coefficient of friction of one material on another is the ratio of the force required to start one moving over the other to the total force pressing the two together. Thus, the static coefficient of friction represents a tendency to prevent slippage or movement between two bodies. Coefficience of friction can be determined by a number of techniques, and any reliable technique which can be used to compare a modifier material with polytetrafluoroethylene on polysiloxane can be used. ASTM Standard D1895-75 can be used. The static coefficient of friction of polytetrafluoroethylene against steel and against itself is about 0.04. Preferably, the static coefficient of friction of the modifier against the polysiloxane is at least 25% higher than that of polytetrafluoroethylene.

Toughness is a different parameter than softness. One material can be softer than another, yet still be more brittle. The important criterion in the present invention is the toughness of the modifier relative to that of the polysiloxane. When the modifier is tougher than and adherent to the polysiloxane, cracks forming in the polysiloxane tend to be stopped and the stresses absorbed in the modifier particles. Toughness is the tendency to resist the formation and propagation of cracks and can be defined as the property of absorbing energy before fracture. With consolidated bodies rather than coatings, it is usually represented by the area under a stress-strain curve. Toughness involves both ductility and strength and thus is the opposite of the combined parameters of brittleness and lack of strength. Although the concept of toughness is usually encountered in the arts and sciences of consolidated materials such as metal sheet and bar, it is helpful in understanding the behavior of coatings, particularly in the context of the present invention.

Various tests can be used to determine the relative toughness of a material. The most relevant tests for purposes of the present invention are tests which show the relative degree of toughness in a coating. Thus, a suitable test would be forming a coating of the material to be tested on a substrate which can be dissolved away without harming the coating, and then obtaining a stress-strain curve by a tensile test of the coating itself. For example, a polysiloxane coating could be produced on aluminum metal and the aluminum dissolved away to leave a film of the polysiloxane. Materials which are not readily formed into coatings can be prepared by various techniques such as polymerizing in situ to form the coating or using fugitive coalescing agents which can be burned off or vaporized.

The optimum amounts of modifier are influenced by the nature and the particle size of the material. For instance, coating compositions of the invention containing polyphenylene sulfide which are pebble-milled for a longer time, thus having small particle sizes, are found to give craze avoidance equivalent to that of similar compositions with larger amounts of polyphenylene sulfide which are milled a shorter time and have larger particle sizes.

In contrast to the modifiers of the present invention, metal powders, tough but slippery and nonadherent particulate materials such as fluorocarbon resins, including polytetrafluoroethylene and perfluorinated ethylene propylene polymers, and adherent but relatively brittle materials such as oxide pigments, graphite and carbon black generally do not permit the production of durable craze-resistant polysiloxane coatings having thicknesses greater than about 25 $\mu$m (1 mil). Conceivably, a multi-layered particulate material which has adequate toughness and friction on the outside but less so on the inside could meet the requirements of the invention.

The polyarylene sulfide preferred for use with the present invention is a polyphenylene sulfide, such as that described in U.S. Pat. No. 3,487,454—Oates et al. (1969). Polyphenylene sulfide is available commercially as "Ryton" V-1 from Phillips Petroleum Company.

Polyarylene sulfones useful with the invention include "Astrel" 360 made by Minnesota Mining and Manufacturing Company and other products of Union Carbide Corporation and ICI Ltd., as described in U.S. Pat. No. 3,981,945—Atwood et al. (1976).

The polyamide-imide resin used with the invention is preferably a partially imidized polyamic acid such as resin AI 10 available from Amoco. Suitable related partially or fully imidized polyamic acids and methods for their preparation are described in U.S. Pat. No. 3,179,634—Edwards (1965).

The polyparahydroxy benzoic acid preferred for use with the invention is available as "Ekonol" 6000 from Carborundum Company. Related compositions are described in U.S. Pat. No. 3,974,250—Cottis et al. (1976).

Various polysiloxane resins are usable in the practice of the invention. The examples illustrate the claims, and the several grades of polysiloxane resins used are identified by the product designations under which they are sold by Dow Corning Corporation and General Electric Company with the code letters DC and SR, respectively.

In the examples, the titanium dioxide pigment used was "Ti-Pure" 900 sold by the Du Pont Company; the alumina was "Reactive Alumina" A-15 SG sold by Alcoa; the channel black was "Indo-Tex" CB sold by Sid-Richardson Company; and the iron oxide was red iron oxide R-2200 sold by Pfizer, Inc.

In the following examples, the indicated materials were mixed and pebble-milled for 24 hours, producing an average particle size of the modifier generally on the order of 2–3 μm. The particles after milling tend to be rather rounded with fairly uniform particle sizes. The resulting formulations were filtered through a 100-mesh screen (U.S. Standard Sieve Size) and applied over grit-blasted aluminum substrates to a dry film thickness of 25–50 μm. The coated substrates were air-dried and then placed in a 425° C. (800° F.) oven until the temperature of the metal substrate reached 425° C. (800° F.).

In all the examples, the coatings had a satisfactory appearance. They did not stress craze or form cracks and could be used satisfactorily in cookware, exhibiting substantial durability. In the examples, all parts, percentages and proportions are given by weight.

As an alternative to the procedures of the examples, and preferably for thicker coatings, the air dried coating can be prebaked at 150°–205° C. (300°–400° F.) for an adequate time to aid in preventing significant foaming and bubbling at the higher temperatures used for the actual baking. The coatings should be baked at temperatures and for times suitable for curing the polysiloxane resins used, normally in the range of 205°–480° C. (400°–900° F.), preferably 370°–425° C. (700°–800° F.). The actual temperatures and times used will depend on the nature of the polysiloxane, as is known in the art; but for purposes of speedy manufacture, baking temperatures are usually selected that are high enough so that little time at temperatures is required, such as up to five minutes. If polyphenylene sulfide is included in coatings intended for food contact use, the baking temperature should be above 370° C. (700° F.). Also, thicker coatings can be built up in multiple layers, preferably with each layer prebaked before the next layer is applied. Coatings of the invention are generally and preferably applied directly to the metal surface, although surface treatments and primers could be used.

EXAMPLE 1

| | |
|---|---|
| Polymethylphenylsiloxane XR-6-2230 (Dow Corning) | 29.25 |
| Xylene | 2.81 |
| Butyl acetate | 25.53 |
| Cellosolve acetate | 14.51 |
| Methyl iso-butyl ketone | 6.26 |
| 8% zinc octoate in VMP naphtha | 1.83 |

-continued

| | |
|---|---|
| Silicone fluid DC-200 | 0.21 |
| Titanium dioxide pigment | 7.11 |
| Alumina pigment | 7.33 |
| Polyphenylene sulfide "Ryton" V-1 | 5.16 |
| | 100.00 |

EXAMPLE 2

Same as Example 1 except:

| | |
|---|---|
| Titanium dioxide pigment | 6.11 |
| Polyphenylene sulfide | 0.00 |
| Polyarylene sulfone "Astrel" 360 | 4.16 |

EXAMPLE 3

Same as Example 1 except:

| | |
|---|---|
| Polyphenylene sulfide | 0.00 |
| Polyamide-imide resin AI 10 | 5.16 |

EXAMPLE 4

Same as Example 1, except:

| | |
|---|---|
| Polyphenylenesulfide | 0.00 |
| Polyparahydroxy benzoic acid "Ekonol" 6000 | 5.16 |

EXAMPLES 5-12

| | 5 | 6 | 7 | 8 | 9 | 10 | 11 | 12 |
|---|---|---|---|---|---|---|---|---|
| Polymethylphenylsiloxane | | | | | | | | |
| DC 801 | 48.75 | — | — | — | — | — | — | — |
| DC 803 | — | 58.50 | — | — | — | — | — | — |
| DC 805 | — | — | 58.50 | — | — | — | — | — |
| DC 806A | — | — | — | 58.50 | — | — | — | — |
| DC 840 | — | — | — | — | 48.75 | — | — | — |
| SR 112 | — | — | — | — | — | 58.50 | — | — |
| SR 82 | — | — | — | — | — | — | 48.75 | — |
| SR 240 | — | — | — | — | — | — | — | 58.50 |
| Xylene | 26.00 | 25.64 | 25.64 | 25.64 | 26.00 | 25.64 | 26.00 | 25.64 |
| VMP naphtha | 3.61 | 3.61 | 3.61 | 3.61 | 3.61 | 3.61 | 3.61 | 3.61 |
| 8% zinc octoate in VMP naphtha | 1.83 | 1.83 | 1.83 | 1.83 | 1.83 | 1.83 | 1.83 | 1.83 |
| Titanium dioxide pigment | 7.32 | 7.32 | 7.32 | 7.32 | 7.32 | 7.32 | 7.32 | 7.32 |
| Alumina pigment | 7.33 | 7.33 | 7.33 | 7.33 | 7.33 | 7.33 | 7.33 | 7.33 |
| Polyphenylene sulfide "Ryton" V-1 | 5.16 | 5.16 | 5.16 | 5.16 | 5.16 | 5.16 | 5.16 | 5.16 |

EXAMPLES 13-16

| | 13 | 14 | 15 | 16 |
|---|---|---|---|---|
| Polymethylphenylsiloxane XR-6-2230 | 28.99 | 29.36 | 30.41 | 29.25 |
| Xylene | 2.79 | 2.82 | 2.92 | 2.81 |
| Butyl acetate | 25.53 | 25.62 | 26.54 | 25.53 |
| Cellosolve acetate | 14.39 | 14.56 | 15.08 | 14.51 |
| Methyl isobutyl ketone | 6.26 | 6.28 | 6.51 | 6.26 |
| 8% zinc octoate in VMP naphtha | 1.45 | 1.47 | 1.52 | 1.83 |
| Silicone fluid DC-200 | 0.21 | 0.21 | 0.22 | — |
| Alumina pigment | 9.35 | 10.36 | 10.73 | 6.00 |
| Micronized talc | — | — | — | 3.56 |
| Polyphenylene sulfide "Ryton" V-1 | 5.12 | 5.18 | 5.37 | 5.16 |
| Titanium dioxide pigment | — | — | — | 7.11 |
| Channel black | 1.23 | 4.14 | 0.09 | — |
| Iron oxide | 4.94 | — | — | — |
| Mica pigment coated with TiO$_2$ "Afflair" NF 152 D | — | — | 0.61 | — |

EXAMPLES 13–16-continued

|  | 13 | 14 | 15 | 16 |
|---|---|---|---|---|
| pigment (Du Pont) |  |  |  |  |

EXAMPLE 17

| Xylene | 61.58 |
|---|---|
| N-Butyl acetate | 559.57 |
| Cellosolve acetate | 318.03 |
| Methyl isobutyl ketone | 137.22 |
| 8% zinc octoate in VMP naphtha | 73.2 |
| Silicone resin XR-6-2230 | 1206.0 |
| Titanium dioxide pigment | 285.6 |
| Alumina pigment | 294.4 |
| Polyphenylenesulfide-"Ryton" V-1 | 207.2 |

EXAMPLE 18

| PTFE dispersion in water at 60% solids - T30 (Du Pont) | 26.0 |
|---|---|
| Ethylene glycol | 26.0 |

Add this composition to the composition of Example 17 and pebble mill for 15 minutes.

I claim:

1. A coated substrate having a coating consisting essentially of a continuous phase of a cross-linked polysiloxane resin which has dispersed throughout it about 5–30% by weight of a discontinuous particulate phase of a polyamide-imide modifier, based on the combined weight of the resin and the modifier,
wherein the modifier has an average particle size in the range of 0.1–15 μm, the modifier is tougher than the coating, and the modifier has a higher static coefficient of friction against the polysiloxane resin than does polytetrafluoroethylene, and wherein the polysiloxane resin has a degree of elongation not greater than about 4%.

2. The coated substrate of claim 1 wherein the cross-linked polysiloxane resin has one or more of the repeating units

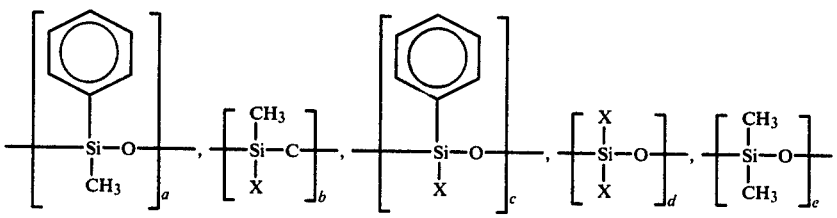

wherein
X is functional group which allows cross-linking at its site, and
a, b, c, d and e are of a magnitude and in proportions which provide the resin with a degree of substitution, measured as the ratio of phenyl plus methyl groups to silicon atoms, of at least about 1.0, and a ratio of phenyl groups to silicon atoms of at least about 0.3.

3. The coated substrate of claim 1 wherein X is the hydroxyl group, having a silicon-bonded hydroxyl content of at least about 3%, based on the weight of the polysiloxane resin.

4. The coated substrate of claim 3 wherein the silicon-bonded hydroxyl content is at least about 4%.

5. The coated substrate of claim 1 wherein the average particle size of the modifier is less than one-half the thickness of the coating.

6. The coated substrate of claim 5 wherein the average particle size of the modifier is less than one-quarter the thickness of the coating.

7. The coated substrate of claim 1 wherein the average particle size of the modifier is in the range of 0.5–5 μm.

8. The coated substrate of claim 1 wherein the amount of modifier is in the range of about 10–20%.

9. The coated substrate of claim 1 wherein the coating is about 20–125 μm thick.

10. The coated substrate of claim 9 wherein the coating is about 25–75 μm thick.

11. The coated substrate of claim 2 wherein X is the hydroxyl group, having a silicon-bonded hydroxyl content of at least about 4%, based on the weight of the polysiloxane resin, the average particle size of the modifier is in the range of 0.5–5 μm, the amount of modifier is in the range of about 10–20%, the coating is about 25–75 μm thick, and the average particle size of the modifier is less than one-quarter the thickness of the coating.

12. A process of producing a coated substrate of claim 1 by applying to a substrate a coating composition consisting essentially of a cross-linkable polysiloxane resin-forming precondensate and about 5–30% by weight of a polyamide-imide particulate organic modifier, based on the combined weight of the precondensate and the modifier,
wherein the modifier has an average particle size in the range of 0.1–15 μm, the modifier is tougher than the cross-linked coating made from the coating composition, and the modifier has a higher static coefficient of friction against the polysiloxane resin that does polytetrafluoroethylene, and wherein the polysiloxane resin has a degree of elongation not greater than about 4%,
and baking the coated substrate to cause the polysiloxane resin-forming precondensate to cross-link, whereby the resulting coating comprises a continuous phase of the polysiloxane resin which has dispersed throughout it a discontinuous phase of the modifier.

13. The process of producing a coated substrate of claim 2 by applying to the substrate a coating composition wherein the polysiloxane resin is provided as a precondensate having the defined units and baking it to cause the polysiloxane resin-forming precondensate to crosslink, whereby the resulting coating comprising a continuous phase of the polysiloxane resin which has dispersed throughout it a discontinuous phase of the modifier.

14. The process of claim 13 wherein the baking is done at temperatures about in the range of 205°–480° C. for a time long enough to substantially crosslink the polysiloxane resin-forming precondensate.

15. The process of claim 14 wherein the baking is done at temperatures about in the range of 370°–425° C. for a time long enough to substantially cross-link the polysiloxane resin-forming precondensate.

16. The process of claim 15 wherein, before baking, the coated substrate is prebaked at temperatures about in the range of 150°–205° C. for a time sufficient to prevent significant foaming and bubbling upon baking.

* * * * *